United States Patent
Baker et al.

(10) Patent No.: US 6,800,584 B2
(45) Date of Patent: Oct. 5, 2004

(54) GOLD CATALYSTS SUPPORTED ON GRAPHITIC CARBON NANOSTRUCTURES

(75) Inventors: R. Terry K. Baker, Hopkinton, MA (US); Nelly M. Rodriguez, Hopkinton, MA (US)

(73) Assignee: Catalytic Materials LLC, Holliston, MA (US)

( * ) Notice: Subject to any disclaimer, the term of this patent is extended or adjusted under 35 U.S.C. 154(b) by 8 days.

(21) Appl. No.: 10/266,973

(22) Filed: Oct. 8, 2002

(65) Prior Publication Data

US 2003/0073573 A1 Apr. 17, 2003

Related U.S. Application Data

(60) Provisional application No. 60/329,220, filed on Oct. 12, 2001.

(51) Int. Cl.[7] ............................ B01J 21/18; B01J 23/02; B01J 23/40; B01J 23/74; C01B 31/04
(52) U.S. Cl. .................. 502/184; 502/185; 502/527.14; 502/527.16; 502/524.27; 423/448
(58) Field of Search ................................ 502/184, 185, 502/527.14, 527.16, 527.24; 423/448

(56) References Cited

U.S. PATENT DOCUMENTS

| | | | | |
|---|---|---|---|---|
| 4,122,040 A | * | 10/1978 | McCarroll et al. | .......... 502/184 |
| 5,413,866 A | | 5/1995 | Baker et al. | |
| 6,485,858 B1 | * | 11/2002 | Baker et al. | .................. 429/40 |
| 6,537,515 B1 | | 3/2003 | Baker et al. | |
| 6,624,112 B2 | * | 9/2003 | Hasegawa et al. | .......... 502/339 |
| 2003/0045425 A1 | * | 3/2003 | Ruth et al. | .................. 502/325 |

OTHER PUBLICATIONS

M. Haruta, N. Yamada, T. Kobayashi and S. Iijima, "Gold Catalysts Prepared by Coprecipitation for Low–Temperature Oxidation of Hydrogen and of Carbon Monoxide", Journal of Catalysts 115, pp. 301–309, 1989, Jun. 1988.

S.D. Lin, M. Bollinger and M.A. Vannice, "Low temperature CO oxidation over Au/Tio2 and Au/Sio2 catalysts", Catalysis Letters 17, pp. 245–262, 1993, Oct. 1992.

Laura Prati and Michele Rossi. "Gold on Carbon as a New Catalyst for Selective Liquid Phase Oxidation of Diols", Journal of Catalysis 176, pp. 252–560, 1998, Mar. 1998.

Masatake Haruta, "Size– and support–dependency in the catalysis of gold", Catalysis Today 36, pp. 153–166, 1997, no month.

Y. Lou, M. Maye, L. Han, J. Lou and C. –J. Zhong, "Gold–platinum alloy nanoparticle assembly as catalyst for methanol electrooxidation", Chem. Community, pp. 473–474, 2001, Feb. 2001.

* cited by examiner

Primary Examiner—Mark L. Bell
Assistant Examiner—Patricia L. Hailey
(74) Attorney, Agent, or Firm—Henry E. Naylor; Kean, Miller, Hawthorne, D'Armond, McCowan & Jarman, LLP

(57) ABSTRACT

Gold-containing catalysts, which catalyst is comprised of gold on a nanostructure support, which support is characterized as graphite nanofibers comprised of graphite sheets, which graphite sheets are oriented substantially perpendicular or parallel to the longitudinal axis of the nanofiber and wherein said graphite nanofiber contains exposed surfaces and wherein at least about 95% of said exposed surfaces are comprised of edge sites.

7 Claims, 1 Drawing Sheet

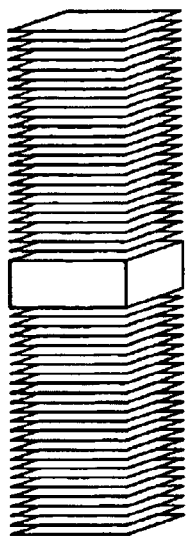
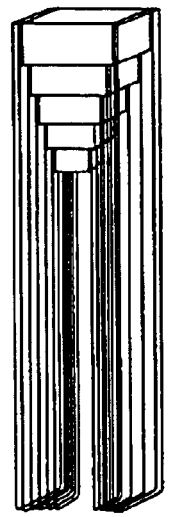
FIG. 1A  FIG. 1B
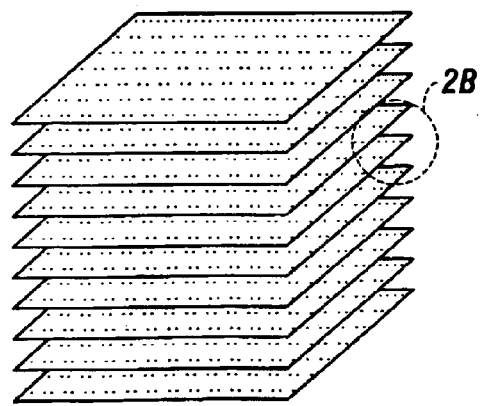
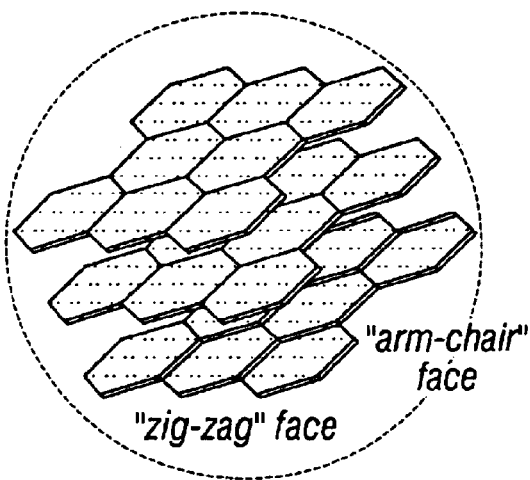
Stacking of Graphite
Layers in "Platelet" GNF
FIG. 2A
Enlargment of the
Marked Region (Left)
FIG. 2B

GOLD CATALYSTS SUPPORTED ON GRAPHITIC CARBON NANOSTRUCTURES

CROSS REFERENCE TO RELATED APPLICATIONS

This application claims benefit of Provisional Application No. 60/329,220 filed Oct. 12, 2001.

FIELD OF THE INVENTION

The present invention relates to gold-supported catalysts wherein the support material is comprised of graphitic carbon nanostructures, preferably layered nanostructures The gold supported catalysts are suitable for use as hydrogenation catalysts

BACKGROUND OF THE INVENTION

Gold has limited use as a catalytic metal since it has generally been regarded as inert. In fact, it has even been used as a coating for various devices to inhibit the catalytic activity of other metals. Some of the limited catalytic activity of gold include its activity for the low temperature carbon monoxide oxidation and oxidation of propylene when supported on titanium oxide. This was reported by Haruta et al. in Journal of Catalysis, 115, 301 (1989) Also, activated carbon supported gold catalysts are known to be more resistant towards deactivation than the corresponding palladium or platinum on carbon systems for the selective liquid phase oxidation of diols. See Journal of Catalysis, 176, 552 (1998). The advantages of using gold-platinum alloys supported on glassy carbon compared with an analogous pure platinum catalyst for the electro-oxidation of methanol has also been demonstrated. It is also known that the interaction of gold crystallites with supports that are semi-conducting in nature could cause modifications to the metal surface atoms that stimulate catalytic activity. Thus, the chemical and electronic nature of the support appears to play a key role in stimulating the catalytic activity of gold.

The electrical conductive properties of graphite offer advantages when the material is used as a catalyst support medium for small particles. Unfortunately, in its conventional form of flat sheets, graphite has a relatively low surface area (~0.5 $m^2/g$) and the high fraction of exposed basal plane regions are relatively inert with respect to interaction with other materials. The weak interaction of metals with the basal plane of graphite results in the mobility and eventually sintering of the particles, a phenomenon that reduces the efficiency of the catalyst as a lower surface area is exposed.

Therefore, there remains a need in the art for ways to increase the catalytic activity of gold.

SUMMARY OF THE INVENTION

In accordance with the present invention there is provided a gold-containing catalyst, which catalyst is comprised of gold on a nanostructure support, which support is characterized as graphite nanofibers comprised of graphite sheets, which graphite sheets are oriented substantially perpendicular or parallel to the longitudinal axis of the nanofiber and wherein said graphite nanofiber contains exposed surfaces and wherein at least about 95% of said exposed surfaces are comprised of edge sites.

In a preferred embodiment of the present invention, the graphite nanofiber is further characterized as possessing: (i) a surface area from about 0.2 to 3,000 $m^2/g$ as determined by $N_2$ adsorption at −196° C., (ii) a crystallinity from about 50% to about 100%, and (iii) a distance from about 0.335 nm to about 0.67 nm between the graphite sheets.

In another preferred embodiment, at least a portion of the edges of the graphite nanofiber contain a functional group selected from the group consisting of C—OH, C=O, C—O—C, and COOH.

In still another embodiment of the present invention, the graphite nanofibers are characterized as having a crystallinity greater than about 90%.

In yet other preferred embodiments, the carbon nanofibers are characterized as having (i) a surface area from about 50 to 800 $m^2/g$; and (ii) a crystallinity from about 95% to 100%.

BRIEF DESCRIPTION OF THE FIGURES

FIGS. 1*a* and 1*b* hereof are simplified drawings of the types of arrangements of graphite sheets that may be present in the nanofibers used in this invention. FIG. 1*a* shows the graphite sheets substantially perpendicular to the longitudinal axis of the nanofiber, and FIG. 1*b* shows the sheets substantially parallel to the longitudinal axis of the nanofiber.

FIG. 2*a* is schematic representation of the stacking order of graphite sheets in the graphite nanofibers of the present invention.

FIG. 2*b* is a detailed representation of the difference in carbon-atom arrangement at the edge regions that can be either "armchair" or "zigzag".

DETAILED DESCRIPTION OF THE INVENTION

When metal catalyst particles are dispersed on conventional carbon materials, even on conventional graphitic materials, they typically exhibit relatively weak interactions with the basal plane regions of the carbon resulting in the formation of relatively large globular entities (like oil and water). Most of the metal atoms are contained in the globular entities and are consequently unavailable to perform the desired catalytic reaction. The carbon graphitic nanostructure catalyst support materials of the present invention enable the catalytic particles (gold particles) to be deposited in such a manner that they are spread in the form of a thin film over the surface of the carbon. The resulting catalyst-containing structure gives rise to the most efficient use of catalytic metal and thus optimizes the catalytic efficiency of the resulting catalyst The inventors hereof have discovered that many of the disadvantages associated with gold as a catalytic metal are overcome by the use of graphitic carbon nanostructures as the support material. The graphitic nanostructure support materials are herein referred to as nanofibers and are those that are comprised of graphite sheets that are aligned in a direction from substantially perpendicular to substantially parallel to the longitudinal (or growth) axis of the nanofiber. In addition, the exposed surfaces of the nanofibers constituting the support will consist of over 95% edge regions, in contrast to conventional graphite that consists almost entirely of basal plane regions (about 95%) and very little edge sites (about 5%).

The graphite nanofibers of the present invention are further characterized as having: (i) a surface area from about 0 2 to 3,000 $m^2/g$, preferably from about 50 to 800 $m^2/g$, more preferably from about 100 to 700 $m^2/g$, and most preferably from about 250 to 350 $m^2/g$, which surface area is determined by $N_2$ adsorption at −196° C.; (ii) a crystallinity from about 50% to about 100%, preferably from about 75% to 100%, most preferably from about 90% to 100%, and ideally at least about 95%; (iii) interstices of about 0 335 nm to about 0.67 nm, preferably from about 0.335 nm to about 0.40 nm, and most preferably about 0.335 nm to about 0.347 nm; and surfaces of said nanostructure that define said interstices, which surfaces have sorption properties with respect to hydrogen. The nanofibers used in the present invention can also have widths from about 0.75 nm to about 1,000 nm, preferably from about 0 75 nm to about 500 nm, and more preferably from about 0.75 nm to 200 nm. It is to be understood that "nm" means nanometer. Suitable intercalation methods can expand the interlayer spacing up to values of about 1.025 nm. The surface area of the carbon nanofibers can be increased by careful activation with a suitable etching agent, such as carbon dioxide, steam, or the use of a selected catalyst, such as an alkali or alkaline-earth metal.

The preferred layered nanofibers are graphite nanofibers. In its conventional form, graphite consists almost entirely of basal plane regions (about 95%) with very little edge regions (about 5%). On the other hand, certain types of graphite nanofibers of the present invention, are the opposite; they are comprised of at least about 95% edges and about 5% basal planes. It is well known in the art that metal particles can undergo substantial modifications in catalytic performance when dispersed on different types of support media. Indeed, this concept has been proven for the case where nickel particles were dispersed onto a graphite nanofiber and the system subsequently used for a series of catalytic hydrogenation reactions. Similar performance for the hydrogenation of selected hydrocarbons was realized with 5% nickel on graphite nanofiber catalyst compared to a 25% loading of nickel on γ-alumina.

The carbon nanofibers of the present invention are produced by growing them with the use of a suitable catalyst in the presence of an effective carbon-containing compound. They are preferably grown from unsupported catalytic metal powders, although they can also be grown on a conductive substrate onto which catalytic metal particle precursors have been deposited. Non-limiting examples of suitable conductive substrate materials from which the carbon nanofibers may be grown include: graphitic materials, particularly graphite nanofibers; and metallic substrates, such as a metallic wire, mesh, or screen. If a substrate is used, it is preferred that the substrate be in a form selected from the group consisting of sheet, fiber, or powder It is also within the scope of the present invention that a mixture of metal powders be used As previously mentioned, it is most preferred in the practice of the present invention that the nanofibers be grown without the use of a substrate. A process for depositing the catalytic metal of the substrate can be found in U.S. Pat. No. 5,413,866, which is incorporated herein by reference.

Catalysts suitable for growing the graphite nanofibers of the present invention include Group VIII metals, preferably Fe, and Ni-based catalysts. The catalysts are typically alloys or multi-metallics comprised of a first metal selected from the metals of Group IB of the Periodic Table of the Elements, and a second metal selected from the group consisting of Fe, Ni, Co, Zn, and mixtures thereof Group IB metals are Cu, Ag, and Au. Preferred are Cu and Ag with Cu being the most preferred. The Group IB metal is present in an amount ranging from about 0.5 to 99 at. % (atomic %). A third metal may also be present. Although there is no limitation with respect to what the particular third metal can be, it is preferred that it be selected from the group consisting of Ti, W, Sn and Ta. When a third metal is present, it is substituted for up to about 20 at. %, preferably up to about 10 at. %, and more preferably up to about 5 at. %, of the second metal. It is preferred that the catalyst be comprised of copper in combination with Fe, Ni, or Co. More preferred is copper, in combination with Fe and Ni, from an economic point of view. That is, a catalyst in which Fe is used in place of a portion of the Ni would be less expensive than a catalyst comprised of Cu in combination with only Ni.

The structural forms of the nanofibers of the present invention can be controlled to a significant degree. For example, use of a catalyst that is comprised of an Fe Cu bimetallic powder will produce predominantly straight, or "platelets", nanofibers, having their graphite sheets substantially perpendicular to the longitudinal axis of the nanofibers when grown in a mixture of $CO/H_2$. In fact, such as a structure is capable of having substantially 100% exposed edges. The preferred bimetallic catalyst will contain up to about 99 atomic %, even up to about 70 atomic %, or even up to about 50 atomic %, preferably up to about 30 atomic %, more preferably up to about 10 atomic %, and most preferably up to about 5 atomic % copper, with the remainder being Fe.

Reacting the catalyst in a heating zone with the vapor of a suitable carbon-containing compound, for an effective amount of time, produces the nanofibers of the present invention. By an effective amount of time, we mean, that amount of time needed to produce the desired nanofiber structural arrangement. This amount of time will, generally, be from about 10 minutes to about 8 hours, preferably from about 10 minutes to about 6 hours, more preferably from about 15 minutes to 2 hours, and most preferably from about 15 minutes to about 1 hour. The heating zone is maintained at a temperature from the decomposition temperature of the carbon-containing compound to the deactivation temperature of the catalyst. Generally, this temperature will range from about 500° C. to about 700° C., and preferably from about 550° C. to about 650° C.

Carbon-containing compounds suitable for use in growing the nanofibers of the present invention are compounds composed mainly of carbon atoms and hydrogen atoms, although carbon monoxide may also be used. The carbon-containing compound, which is typically introduced into the heating zone in gaseous form, will generally have no more than 8 carbon atoms, preferably no more than 6 carbon atoms, more preferably no more than 4 carbon atoms, and most preferably no more than 2 carbon atoms. Non-limiting examples of such compounds include carbon monoxide, methane, ethane, ethylene, acetylene, propane, propylene, butane, butene, butadiene, pentane, pentene, cyclopentadiene, hexane, cyclohexane, benzene, and toluene. Combinations of gases are preferred, particularly carbon monoxide and ethylene; carbon monoxide and hydrogen.

If not already present in the desired gas mixture, it may be desirable to have an effective amount of hydrogen present in the heating zone. By an effective amount, we mean that minimum amount of hydrogen that will maintain a clean catalyst surface (free of carbon residue), however, not so much that will cause excessive hydrogasification (or burn-off) of carbon from the nanofibers and/or fiber substrate structure, if present. Generally, the amount of hydrogen present will range from about 5 to 40 vol. %, preferably from about 10 to 30 vol. %, and most preferably from about 15 to 25 vol. %. Hydrogen serves two competing functions. For example on the one hand, it acts as a cleaning agent for the catalyst and on the other hand it hydrogasifies, or causes carbon burn-off, of the carbon structure. For some catalyst systems, such as the preferred Cu.Fe bimetallic, the hydrogasification reaction is relatively slow, thus, an effective amount of hydrogen is needed to clean the catalyst in order to keep it clean of carbon residue and maintain its' activity. Little or no hydrogen is needed in the heating zone for other catalyst systems, such as Cu:Ni, where the activity is so high that excessive hydrogasification occurs. The Cu:Ni is so active that it utilizes essentially all of the carbon deposited thereon to grow nanofibers, and thus, there is generally no carbon residue to clean off.

After the nanofibers are grown, it may be desirable to treat the final structure with an aqueous solution of an inorganic acid, such as a mineral acid, to remove any excess catalyst particles. Non-limiting examples of mineral acids that can be used include sulfuric acid, nitric acid, and hydrochloric acid. Preferred is hydrochloric acid.

Further, the edges of the graphite sheets may be etched with an appropriate etching agent, preferably carbon dioxide, steam, or a suitable catalyst such as an alkali or alkaline-earth metal in order to increase the surface area. In addition, the edges of the graphite sheets can also be treated with an oxidizing agent such as hot nitric acid, potassium permanganate, hydrogen peroxide, et cetera in order to introduce functional groups such as C—OH, C=O, C—O—C, and COOH that can in turn anchor metal particles and prevent sintering. The nanofibers of the present invention are also suitable for the storage of other small gas molecules, such as He, $O_2$, NO, $N_2O$, $NH_3$, CO, $CO_2$, and $CH_4$, and which can also be stored between the platelets.

The graphite nanofibers of the present invention can be classified according to the arrangement of the graphite sheets. The "platelet" structure (FIG. 1a) is where the graphite sheets are substantially perpendicular to the longitudinal axis of the nanofiber. The "ribbon" structure (FIG. 1b) is where the alignment of the graphite sheets is substantially parallel to the longitudinal axis of the nanofiber. The carbon atoms at the graphite edge regions of the nanofibers can adopt one of two arrangements, the so-called "armchair" or "zigzag" conformations, as shown in FIG. 2a hereof. In the "platelet" type of arrangement the nanofiber exposes an equivalent number of "armchair" and "zigzag" faces to the gas phase. On the other hand, the surface of the "ribbon" nanofiber consists of a relatively large fraction of "zigzag" faces. When nickel particles are dispersed on these two types of nanofiber structures an entirely different pattern of catalytic behavior is achieved. This difference, in catalytic performance, of the metal particles may be attributed to the different geometry adopted by the metal crystallites on the edges of nanofiber. The graphite sheets of the nanofiber-support media may act as templates for the dispersed metal crystallites, which adopted a specific geometry that is dictated by their particular site location. The active state of nickel is one where the metal particles are preferentially located on the "zigzag" faces of the nanostructure surfaces, this is consistent with observations that in a reducing environment nickel preferentially wets and spreads along the "zigzag" faces of graphite, leading to an epitaxial relationship between the metal and the substrate.

As previously stated, prior to the graphite nanofibers being used as a support medium for the catalytic metal, it is essential that the nanofiber be demineralized in a dilute acid. While a standard incipient wetness technique can be used to introduce the desired catalytic metal precursor salt, this operation must be conducted in a non-aqueous media. This is because, in the "as prepared condition" the graphite nanofibers are hydrophobic in nature and poor metal dispersion is achieved if one uses water as the solvent. Electrochemical reduction means can also be used to deposit the desired catalytic metal onto the nanofibers. It is also necessary to select a metal precursor salt that undergoes oxidation at a relatively low temperature in order to avoid gasification of the nanofiber support during the calcination step. For the same reasons a corresponding set of precautions must also be followed during reduction in hydrogen. With these safeguards no loss of support material is recorded during the catalyst preparation procedure The graphite nanofibers of the present invention are used to support gold, which is often thought as being relatively inert with respect to catalytic activity. Such an effective amount will typically be at least that amount that will produce the desired catalytic effect. One preferred reaction is to catalyze the hydrogenation of hydrocarbons in the gas phase. Other proposed uses for the gold-containing catalysts of the present invention include the oxidation of CO and the electrochemical oxidation of methanol. The concentration of gold will typically be from about 2 wt. % to about 30 wt %, preferably from about 5 wt. % to about 20 wt. %, based on the total weight of graphite nanofiber plus gold.

Gold can be introduced onto the graphite nanofiber surface by any suitable method. A preferred method is the so-called "incipient wetness" technique wherein a soluble gold salt is dissolved in a suitable solvent. A non-aqueous solution (methanol, ethanol, butanol) of a suitable gold salt (nitrate of chloride) containing the desired concentration of gold so as to produce a mixture of 0.5 to 30% by weight of gold is slowly added to the graphite nanofiber and constantly stirred for up to eight hours in order to ultimately achieve a uniform dispersion of very small gold particles.

Also, it is preferred that the catalytic metal particles adopt a well-defined geometry as determined by the arrangement of atoms at the edges of the support. Further, the catalyst system where the graphite nanofiber supported catalytic particles are in the form of a "thin-film", or in a "hexagonal shape", or in a flat "pill-box" configuration, or any other arrangement where the width-to-thickness ratio of the particle is very large.

The practice of the present invention leads to a catalyst system where gold is efficiently deposited onto the graphite nanofiber support, which results in a substantially lower metals loading when compared to conventional systems Further, the catalyst systems of the present invention are such that the graphite nanofibers support has a relatively high electrical conductivity and where only the edges are in contact with the catalytic metal particles and, as such, can either donate or remove electrons to, and from, the metal.

Also, the graphite nanofiber catalyst system may also contain gold particles inserted between two adjacent graphite sheets within the graphite nanofiber, a configuration that will effectively prevent particle sintering due to growth and coalescence. As previously mentioned, because of the ability to dissociate hydrogen, the catalytic nanostructure systems of the present invention can be used as hydrogenation catalysts. Further, because of the affinity towards hydrogen the catalyst nanostructures of the present invention can be used to dehydrogenate organic compounds such as, but not limited to, alkanes.

The shape of the nanofibers will be any suitable shape. Non-limiting examples of preferred shapes include straight, branched, twisted, spiral, helical, and coiled. The graphitic platelets can be oriented from substantially perpendicular to substantially parallel to the longitudinal, or growth, axis of the nanofiber. In the case where the graphitic platelets are oriented substantially perpendicular to the growth axis, the carbon nanofibers are sometimes referred to as "platelet". In the case where the graphitic platelets are oriented substantially parallel to the growth axis, the resulting nanofibers are sometimes referred to as a "ribbon-like". The graphitic platelets can also be oriented at an angle to the growth axis and thus are sometime referred to as "herringbone". Further, the surface area of the carbon nanofibers can be dramatically increased by careful activation with a suitable etching agent, such as carbon dioxide, steam, or the use of selected catalyst, such as an alkali or alkaline-earth metal

What is claimed is:

1. A catalyst composition comprised of gold on a support material which support material are graphite nanofibers comprised of graphite sheets, which graphite sheets are oriented substantially perpendicular or parallel to the longitudinal axis of the nanofiber and wherein said graphite nanofiber contains exposed surfaces and wherein at least about 95% of said exposed surfaces are comprised of edge sites.

2. The catalyst composition of claim 1 wherein the graphite nanofibers are further characterized as possessing (i) a surface area from about 0.2 to 3,000 $m^2/g$ as determined by $N_2$ adsorption at $-196°$ C., (ii) a crystallinity from about 50% to about 100%, and (iii) a distance from about 0.335 nm to about 0.67 nm between the graphite sheets.

3. The catalyst composition of claim 1 wherein at least a portion of the edges of the graphite nanofiber contains a functional group selected from the group consisting of C—OH, C=O, C—O—C, and COOH.

4. The catalyst composition of claim 1 wherein the graphite nanofibers are characterized as having the crystallinity greater than about 90%.

5. The catalyst composition of claim 1, wherein the carbon nanofibers are characterized as having: (i) a surface area from about 50 to 800 $m^2/g$; and (ii) a crystallinity from about 95% to 100%.

6. The catalyst composition of claim 1 wherein the concentration of gold is from about 2 wt % to about 30 wt % based on the total weight of the catalyst composition.

7. The catalyst composition of claim 6 wherein the concentration of gold is from about 5 wt % to about 20 wt % based on the total weight of the catalyst composition.

* * * * *